United States Patent Office 3,396,155
Patented Aug. 6, 1968

3,396,155
TRANSITION METAL CATALYSTS FOR THE POLYMERIZATION AND COPOLYMERIZATION OF OLEFINS
André Delbouille and Henri Toussaint, Brussels, Belgium, assignors to Solvay & Cie, Brussels, Belgium, a company of Belgium
No Drawing. Filed May 18, 1965, Ser. No. 456,864
Claims priority, application France, May 28, 1964, 976,150; Apr. 12, 1965, 12,816
16 Claims. (Cl. 260—80.78)

ABSTRACT OF THE DISCLOSURE

The catalysts are obtained by reacting of a transition metal compound such as a halide, halogeno-alkoxide, or alkoxide of a metal of Group IV$b$, V$b$, or VI$b$ of the Periodic Table with a vinyl alcohol copolymer, containing from 1 to 20 molar percent of polymerized vinyl alcohol, and then activating this reaction product with a metal, hydride, or organometallic compound of a metal from Group I to III of the Periodic Table, optionally with the addition of a Friedel-Crafts type halide. The catalysts are useful for the polymerization of $\alpha$-olefins and also for the copolymerization of $\alpha$-olefins with each other and with non-conjugated dienes.

---

The present invention relates to a process of polymerization of olefins and of copolymerization of olefins with one another and/or with non-conjugated diolefins, in the presence of new solid catalysts.

It has already been proposed to polymerize ethylene in the presence of a catalyst constituted by an organometallic compound and a derivative of a transition metal which are deposited on an inert support which may for example be preformed polyethylene (Belgian Patent No. 552,550). In this process the catalyst is simply deposited on the surface of the macromolecular compound, the nature of which is identical to that of the polymer which it is desired to produce.

A different process would consist in chemically bonding the catalyst to a macromolecular compound having reactive groups. British Patent No. 834,217 describes a process of this type, in which titanium tetrachloride is reacted with cellulose to form titanic esters of cellulose. These esters are then activated by organometallic compounds. The activities obtained with this type of catalyst are extremely low, which is explained by the large number of reactive sites, the hydroxyl groups, possessed by the cellulose. The titanium derivative is then completely fixed within the polymer by all its valencies and brings about a cross-linking of the support, which thus becomes almost inactive.

The applicants have found that by selecting a support having a suitably chosen number of hydroxyl groups, it was possible, after reaction with a transition metal compound and activation by an organometallic compound, to obtain catalysts having extremely high activities.

The invention consists in effecting the polymerization of olefins and the copolymerization of olefins with one another and/or with non-conjugated diolefins in the presence of a catalyst constituted by the product of the reaction between a transition metal compound and a vinyl alcohol copolymer containing from 1 to 20 molar percent of vinyl alcohol in the state of polymerization in its molecule, this product being activated by a metal, a hydride, or an organometallic compound of metals of Groups I to III of the Periodic Table, optionally with the addition of a halide of the Friedel-Crafts type.

The vinyl alcohol copolymers utilizable in the process forming the subject of the invention may be obtained by any conventional methods of preparation of vinyl alcohol polymers and copolymers from hydrolyzable polymers or copolymers. They may in particular be obtained by total or partial hydrolysis of the ester groups of vinyl acetate copolymers, particularly of vinyl acetate-ethylene and vinyl acetate-vinyl chloride copolymers, by partial hydrolysis of polyvinyl acetate and also by hydrolysis of the ether groups of vinyl ether based polymers and copolymers. Another method of preparing these copolymers consists in effecting the partial esterification of a vinyl alcohol polymer.

Whatever the method by which they are prepared, it is essential that the vinyl alcohol copolymers used as hydroxylated macromolecular support should have a hydroxyl group content which is neither too high nor too low.

If in fact this content is too high and exceeds about 20 mols percent, the transition metal compound finds too many reactive groups within its reach, is fixed by a plurality of valencies, and may even become completely inactive as a catalyst. Initial cross-linking of the copolymer may also occur, enclosing the transition metal compound in its mass.

On the other hand, if this hydroxyl group content is too low, and less than about 1 mol percent, the quantity of transition metal fixed chemically on the support is insufficient and the activity of the catalyst, evaluated in grams of polymer produced per gram of catalyst, will be only mediocre.

Another important factor governing the activity of catalysts fixed chemically on a hydroxylated macromolecular support belonging to the vinyl alcohol copolymer group is the distribution of the vinyl alcohol units within the copolymer chains. A heterogeneous distribution like that of the block copolymers is less suitable than statistical distribution of the hydroxylated units. A distribution of the latter type is highly desirable because, after reaction, it ensures uniform distribution of the active transition element throughout the entire mass and over the entire surface of the support.

The mechanism of chemical fixation of the transition metal compounds, which is effected through the medium of the OH groups, may be represented as follows, if M' represents a transition metal and X a monovalent reactive group fixed on M':

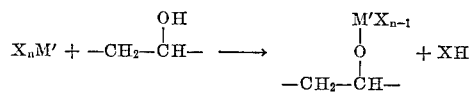

The transition metal compounds utilizable for the preparation of the new catalysts are selected from those which contain radicals having good reactivity in relation to the hydroxyl groups. In particular, use may be made of the halides, halogeno-alkoxides, and alkoxides of metals of the groups IV$b$, V$b$ and VI$b$ of the Periodic Table, and more particularly of the titanium and vanadium derivatives; for example, TiCl$_4$, Ti(OC$_2$H$_5$)$_3$Cl, VOCl$_3$, VCl$_5$ or VO (OC$_4$H$_9$)$_3$.

The reaction of fixation of the compound of a transition metal is accompanied by the liberation of decomposition products. When this compound is a chloride, the libration of hydrogen chloride is observed, for example:

When the starting material is an alkoxide, a certain quantity of the corresponding alcohol is liberated. These compounds, and also the starting products in excess are eliminated by washing the catalysts. The fixation reaction must be effected without the presence of humidity, for example by bringing the boiling point a suspension of the hydroxylated macromolecular compound in a hydrocarbon such as hexane, xylene, or tetraline, containing the transition metal compound. An increase of the quantity of the transition metal compound fixed on the support is generally found when the reaction temperature is raised. This temperature however should not exceed certain limits, in order to avoid the degradation and cross-linking of the marcromolecular compound.

After, reaction, the transition element is fixed chemically to the support; it cannot be eliminated therefrom by physical means, such as washing.

The catalyst obtained in this manner must be activated by bringing it into contact with a metal, a hydride, or an organometallic compound of metals of Groups I, II, and III of the Periodic Table, optionally activated by a halide of the Friedel-Crafts type. The trialkylaluminiums and the alkylaluminium halides are particularly suitable as activators. Another activator is for example metallic aluminium and aluminium chloride.

The activation may be effected immediately before the introduction of the monomers; the catalyst may also be left to ripen for a longer or shorter time at ambient temperature or at a higher temperature.

The process forming the subject of the invention applies to the polymerization of olefins and to the copolymerization of olefins with one another and/or with non-conjugated diolefins, and particularly to the production of polyethylene, polypropylene, polybutene, ethylen-propylene copolymers, and of terpolymers of ethylene, propylene, and non-conjugated diene.

When applied to the polymerization of ethylene, the catalysts according to the invention permit the production of a polyethylene having exceptional properties. Its linearity is such that it contains less than 1 $CH_3$ group per 1000 carbon atoms. It has contents of vinylidene and internal trans groups lower than 0.05 group per 1000 carbon atoms. The melting temperature of this polyethylene, evaluated by differential thermal analysis, attains and exceeds 138° C.

The ethylene-propylene copolymers produced by means of the new catalysts have a particularly high propylene content; they are characterized by an amorphous structure and very good elastomer properties.

The process forming the subject of the invention also permits the production of copolymers of non-conjugated dienes with one or more mono-olefins such as ethylene, propylene, or butene 1.

The non-conjugated dienes which can be used in the process forming the subject of the invention may belong to the following categories:

Non-conjugated aliphatic dienes such as pentadiene 1,4, hexadiene 1,4, hexadiene 1,5;

Non-conjugated monocyclic dienes of the type of 4-vinylcyclohexene,1,3 divinylcyclohexane, cycloheptadiene 1,4, cyclooctadiene 1,5;

Alicyclic dienes having an endocyclic bridge, such as dicyclopentadiene and norbonadiene.

Particularly advantageous terpolymers which can be prepared with the aid of the new catalysts are ethylene-propylene-dicyclopentadiene terpolymers and ethylene-propylene-hexadiene 1,4 terpolymers.

These terpolymers have a range of characteristics which make them particularly interesting elastomers. They are completely amorphous, have molecular weights in the range generally desired, and can be vulcanized with sulphur.

The polymerization and the copolymerization may be carried out according to known techniques: in the gaseous phase, that is to say in the absence of any liquid medium constituting a solvent for the monomer, or in the presence of a dispersion medium in which the monomer is soluble. An inert hydrocarbon which is liquid under the conditions of polymerization, or the monomers themselves, kept in the liquid state under their saturation pressure, may be used as liquid dispersion medium.

Without being limitative, the following examples will enable the spirit and the object of the present invention to be better understood.

Examples 1 to 4

(a) Preparation of vinyl alcohol copolymer.—An ethylene-vinyl acetate copolymer, containing 15 molar percent of vinyl acetate, is dissolved in the hot state in xylene. This solution is then added, with energetic agitation, to a hydrolyzing medium constituted by a solution of NaOH in methanol. The mixture is heated at 60° C. for one hour and then the solvents are carried off with water vapour. The products are carefully washed with demineralized water and then dried, ground, and graded. Under these conditions, hydrolysis is complete and an ethylene-vinyl alcohol copolymer containing 15 molar percent of the latter products is obtained.

(b) Reaction with $TiCl_4$.—The vinyl alcohol copolymer prepared as above is reacted with a solution of $TiCl_4$ in hexane. The mixture is heated for one hour with reflux, whereupon the product is separated and carefully washed with anhydrous hexane. It is then dried in vacuo to a constant weight. The catalyst thus prepared contains 116 grams of titanium per kg. of material.

(c) Polymerization of ethylene.—The organoaluminic activator dissolved in hexane, the catalyst prepared as above, and then 1 litre of hexane purified on $AlCl_3$ and dried on alumina are introduced in succession into a 3-litre stainless steel autoclave which has been dried and flushed with nitrogen.

The whole mixture is brought to 80° C. with agitation, and ethylene is injected with a constant flow of 65 grams per hour, the pressure being limited to 15 kg. per square cm.

After 2 hours the autoclave is opened and the polyethylene formed collected.

The quantities of reagents used, the conditions of the experiment, and the quantities of polyethylene obtained are given in Table I below.

Examples 1 and 2 shown in this table are given by way of comparison.

Example 1 gives the result of a test carried out under identical conditions with a support composed of pure polyvinyl alcohol which has been reacted with $TiCl_4$ for only 5 minutes, with reflux, in xylene. This last catalyst contains 141 grams of titanium per kg. of material.

Example 2 shows that a support containing more than 20 molar percent of vinyl alcohol in the polymerized state produces only slightly active catalysts. The support used in this example is obtained by complete hydrolysis of an ethylene-vinyl acetate copolymer and contains 23.5 molar percent of vinyl alcohol in the polymerized state. This support is reacted with $TiCl_4$ under the conditions indicated in paragraph b above, in order to produce a catalyst containing 58 grams of titanium per kg. of material.

TABLE I

| No. | Catalyst used, grams | Nature of Activator | Quantity of Activator, grams | Mean pressure, kg. per sq. cm. | Weight of polyethylene obtained, grams | Activity of catalyst in grams of polyethylene/grams of catalysts |
| --- | --- | --- | --- | --- | --- | --- |
| 1 | 1.308 | $Al(iC_4H_9)_3$ | 3.83 | 6.83 | 0.5 | 0.38 |
| 2 | 0.631 | $Al(iC_4H_9)_3$ | 1.000 | 9.70 | 3.5 | 5.5 |
| 3 | 0.994 | $Al(iC_4H_9)_3$ | 1.000 | 3.96 | 111 | 112 |
| 4 | 0.987 | $Al(C_2H_5)_2Cl$ | 1.000 | 3.99 | 118 | 120 |

The polyethylene obtained in Example 3 has a viscosimetric molecular weight of 600,000. Its melting temperature, evaluated by differential thermal analysis, is 138° C. Its analysis by infrared spectrometry reveals that it contains less than 1 $CH_3$ group, 0.17 vinyl double bonds, 0.05 vinylidene double bonds, and 0.008 internal trans double bonds per 1000 carbon atoms.

Examples 5 and 6

$TiCl_4$ in solution is reacted in hexane with a copolymer containing 8.3 molar percent of vinyl alcohol, 89.5 molar percent of vinyl chloride, and 2.2 molar percent of vinyl acetate, kept in suspension.

The operation is carried out as described in Examples 1 to 4, and a catalyst is obtained which contains 46 grams of titanium per kg. of material. The trialkylaluminium dissolved in hexane, the catalyst prepared as above, and 1 litre of hexane are introduced into a 3-litre autoclave which has been dried and flushed with pure nitrogen.

The operation is carried out in the same manner as in Examples 1 to 4. Table II below shows the quantities of reagents used, the particular operating conditions, and the quantities of polyethylene obtained.

TABLE II

| No. | Catalyst used, grams | Nature of Activator | Quantity of Activator, grams | Mean pressure, kg. per sq. cm. | Time, Hours | Weight of polyethylene obtained | Activity of catalyst in grams of polyethylene, grams of catalyst |
|---|---|---|---|---|---|---|---|
| 5 | 0.278 | $Al(n.C_3H_7)_3$ | 1.00 | 10.5 | 1 | 81 | 292 |
| 6 | 0.283 | $Al(C_2H_5)_3$ | 1.00 | 8.1 | 2 | 79 | 280 |

The polyethylene obtained melts at 141° C. and its viscosimetric molecular weight is 320,000. Analysis by infrared spectrometry reveals that it contains less than 1 $CH_3$ group, less than 0.20 vinyl groups, less than 0.05 vinylidene groups, and less than 0.01 internal trans groups per 1000 carbon atoms.

Example 7

Propylene is polymerized with a catalyst similar to the one prepared in Example 5, but containing 56 grams of titanium per kg.

0.837 gram of $Al(C_2H_5)_3$ dissolved in hexane, 0.672 gram of the catalyst, 500 millilitres of hexane, and 250 grams of propylene are introduced into an autoclave.

After 5 hours at 50° C., 8 grams of polypropylene are obtained.

Example 8

Ethylene and propylene are copolymerized in the presence of a solvent with a catalyst similar to that used in Example 5 but containing 56 grams of Ti per kg.

1 gram of $Al(iC_4H_9)_3$ dissolved in hexane, 0.501 gram of catalyst, 520 millilitres of hexane, and 67.2 grams of propylene are introduced in succession into a 1.5 litre autoclave.

The whole mixture is brought to 60° C. while agitating, and ethylene is injected in such a manner as to bring the total pressure to 30 kg. per square cm.

The polymerization reaction is extremely vigorous, to such an extent that the experiment must be stopped after only 30 minutes in order to avoid solidification.

119 grams of ethylene-propylene copolymer having a low propylene content are thus obtained, this copolymer being suitable for the production of transparent films.

Example 9

The copolymerization of ethylene and propylene is effected in the absence of solvent by means of a catalyst similar to that used in example 5 but containing 56 grams of Ti per kg.

0.35 gram of $Al(iC_4H_9)_3$ dissolved in hexane, 0.049 gram of catalyst, and 335 grams of propylene are introduced into a 1.5-litre autoclave. The system is brought to 40° C., while introducing ethylene in such a manner as to maintain a constant total pressure of 18.1 kg. per square cm. A solution of 5 mol percent of ethylene in liquid propylene is thus obtained.

After 4 hours, 52 grams of an ethylene-propylene copolymer containing 45 mols of propylene is collected. This copolymer is characterized by a relatively high propylene content, having regard to the composition of the starting mixture; its analysis by X-ray diffraction reveals no crystallinity.

Example 10

Dissolved $TiCl_4$ is reacted in hexane with a copolymer containing 83 molar percent of vinyl alcohol, 89.5 molar percent of vinyl chloride, and 2.2 molar percent of vinyl acetate, kept in suspension.

The mixture is heated with reflux for 1 hour and then the product is separated and washed with hexane. It is then dried under reduced pressure to a constant weight. The product thus obtained contains 66 grams of titanium per kg. of material.

0.474 gram of this product, 0.658 gram of triisobutylaluminium, 336 grams of propylene, and 17.4 grams of dicyclopentadiene are introduced into a 1.5-litre autoclave. The mixture is brought to 40° C. while agitating and introducing ethylene in such a manner as to maintain a constant total pressure of 19.2 kg. per square cm.

After 4 hours the autoclave is opened and the product formed recovered. Analysis shows that it contains 31 mol percent of propylene and double C=C bonds at the rate of 0.74 mol gram per kg.

This product has all the properties of an elastomer and is vulcanizable by sulphur.

Example 11

The terpolymerization of ethylene with propylene and hexadiene 1,4 is effected in the absence of solvent by means of a catalyst identical to that prepared in Example 10.

0.463 gram of this catalyst containing 66 grams of titanium per kg. of material, 0.642 gram of triisobutylaluminum, and 336 grams of propylene are introduced into a 1.5 litre autoclave. The temperature of the mixture is brought to 40° C. and ethylene is introduced so as to maintain a constant total pressure of 19.2 kg. per square cm. A total of 16.9 grams of hexadiene 1,4 is then added progressively throughout the polymerization period.

After three hours the reaction is stopped and 189 grams of an ethylene-propylene-hexadiene 1,4 terpolymer are collected, the propylene content of which is 35 mol percent and the non-saturation expressed in double C=C bonds, is 0.15 mol gram per kg. of terpolymer.

This terpolymer is amorphous and vulcanizable by sulphur.

We claim:

1. A process for the polymerization of α-olefins and the copolymerization of α-olefins with one another and with a non-conjugated diene selected from the group consisting of aliphatic linear non-conjugated diolefins having terminal unsaturation, non-conjugated monocyclic dienes and alicyclic dienes having an endocyclic bridge, which comprises carrying out said polymerization and said copolymerization in the presence of a catalyst constituted by the product of reaction between a halide, a haloalkoxide or an alkoxide of a transition metal of Group IVb, Vb or VIb of the Periodic Table and a vinyl alcohol copolymer containing 1 to 20 molar percent of vinyl alcohol in the state of polymerization in its molecule, this product being activated by a metal, a hydride, or an organometallic compound of metals of groups I to III of the Periodic Table.

2. A process according to claim 1, in which the vinyl alcohol copolymer is an ethylene-vinyl alcohol copolymer.

3. A process according to claim 1, in which the vinyl alcohol copolymer is a vinyl chloride-vinyl alcohol copolymer.

4. A process according to claim 1, in which the transition metal compound is titanium tetrachloride.

5. A process according to claim 1, in which the activator is a trialkylaluminum or an alkylaluminum halide.

6. A process according to claim 1, applied to the polymerization of ethylene, propylene, and butene-1.

7. A process according to claim 1, applied to the copolymerization of ethylene and propylene.

8. A process according to claim 1, applied to the copolymerization of ethylene with propylene and a nonconjugated diene.

9. A process according to claim 1, applied to the copolymerization of ethylene with propylene and dicyclopentadiene.

10. A process according to claim 1, applied to the copolymerization of ethylene with propylene and hexadiene-1,4.

11. A process according to claim 1 is which said transition metal is titanium or vanadium.

12. A process according to claim 11 in which the transition metal compound is vanadium oxytrichloride.

13. As a new industrial product, the catalyst prepared by reaction between a halide, a haloalkoxide or an alkoxide of titanium or vanadium and vinyl alcohol copolymer containing 1 to 20 molar percent of vinyl alcohol in the polymerized state.

14. As a new industrial product, according to claim 13 in which said catalyst is activated by a metal, a hydride or an organometallic compound of the metal of Groups I to III of the of the Periodic Table.

15. A process according to claim 1 in which said product of reaction between the transition metal compound and said vinyl alcohol copolymer is additionally activated by a Friedel-Crafts halide.

16. As a new industrial product according to claim 14 in which said catalyst is additionally activated by a Friedel-Crafts halide.

References Cited

UNITED STATES PATENTS 3,280,096   10/1966   MacKenzie _____ 260—94.9

JOSEPH L. SCHOFER, *Primary Examiner.*

R. S. BENJAMIN, *Assistant Examiner.*